US012389935B2

(12) United States Patent
Veelo et al.

(10) Patent No.: US 12,389,935 B2
(45) Date of Patent: Aug. 19, 2025

(54) DEVICE FOR GRINDING AND MIXING OF HERBS AND/OR TOBACCO AND/OR SPICES, PREPARING AND DISPENSING OF PAPER CONES AND METHOD FOR THE APPLICATION THEREOF

(71) Applicant: JROLL TECH LTD., Nicosia (CY)

(72) Inventors: Jaron Veelo, Nicosia (CY); Rohi Hen, Ypsonas (CY)

(73) Assignee: JROLL TECH LTD., Nicosia (CY)

( * ) Notice: Subject to any disclaimer, the term of this patent is extended or adjusted under 35 U.S.C. 154(b) by 488 days.

(21) Appl. No.: 17/969,705

(22) Filed: Oct. 20, 2022

(65) Prior Publication Data

US 2023/0039557 A1 Feb. 9, 2023

Related U.S. Application Data

(63) Continuation-in-part of application No. 16/762,811, filed as application No. PCT/IB2017/056978 on Nov. 8, 2017, now Pat. No. 11,503,854.

(51) Int. Cl.

| | |
|---|---|
| ***A24C 5/02*** | (2006.01) |
| ***A24B 5/10*** | (2006.01) |
| ***A24C 5/39*** | (2006.01) |
| ***A24C 5/54*** | (2006.01) |
| ***A24F 15/20*** | (2006.01) |
| ***A24F 17/00*** | (2006.01) |
| ***A24F 25/02*** | (2006.01) |
| ***B02C 18/30*** | (2006.01) |
| ***B02C 23/02*** | (2006.01) |

(52) U.S. Cl.

CPC .................. *A24C 5/02* (2013.01); *A24B 5/10* (2013.01); *A24C 5/39* (2013.01); *A24C 5/54* (2013.01); *A24F 15/20* (2013.01); *A24F 17/00* (2013.01); *A24F 25/02* (2013.01); *B02C 18/30* (2013.01); *B02C 23/02* (2013.01)

(58) Field of Classification Search

CPC .... A24C 5/02; A24C 5/42; A24B 7/04; A24B 7/00; B02C 18/144; B02C 13/24; B02C 18/08; B02C 18/2216

See application file for complete search history.

(56) References Cited

U.S. PATENT DOCUMENTS

| | | | |
|---|---|---|---|
| 6,041,921 | A | 3/2000 | Staiano et al. |
| 9,565,972 | B1 | 2/2017 | Ormaza et al. |

(Continued)

FOREIGN PATENT DOCUMENTS

| | | | |
|---|---|---|---|
| CN | 201135126 | Y | 10/2008 |
| CN | 203194527 | U | 9/2013 |

(Continued)

*Primary Examiner* — Michael H. Wilson
*Assistant Examiner* — Stephanie Lynn Moore
(74) *Attorney, Agent, or Firm* — Bayramoglu Law Offices LLC

(57) ABSTRACT

A device for grinding and mixing of herbs and/or tobacco and/or spices, preparing and dispensing of cigarettes is disclosed. The device includes a single removable grinder/mixing unit 1200 that is extractable from the device and storable in a separate container 1600. The modular function enables convenient removal of any remaining herbs and/or tobacco and/or spices from the device for storage, and permits use of another grinder/mixing unit 1200 in the device for the grinding and mixing of other material.

16 Claims, 13 Drawing Sheets

(56) References Cited

U.S. PATENT DOCUMENTS

Figure 1:
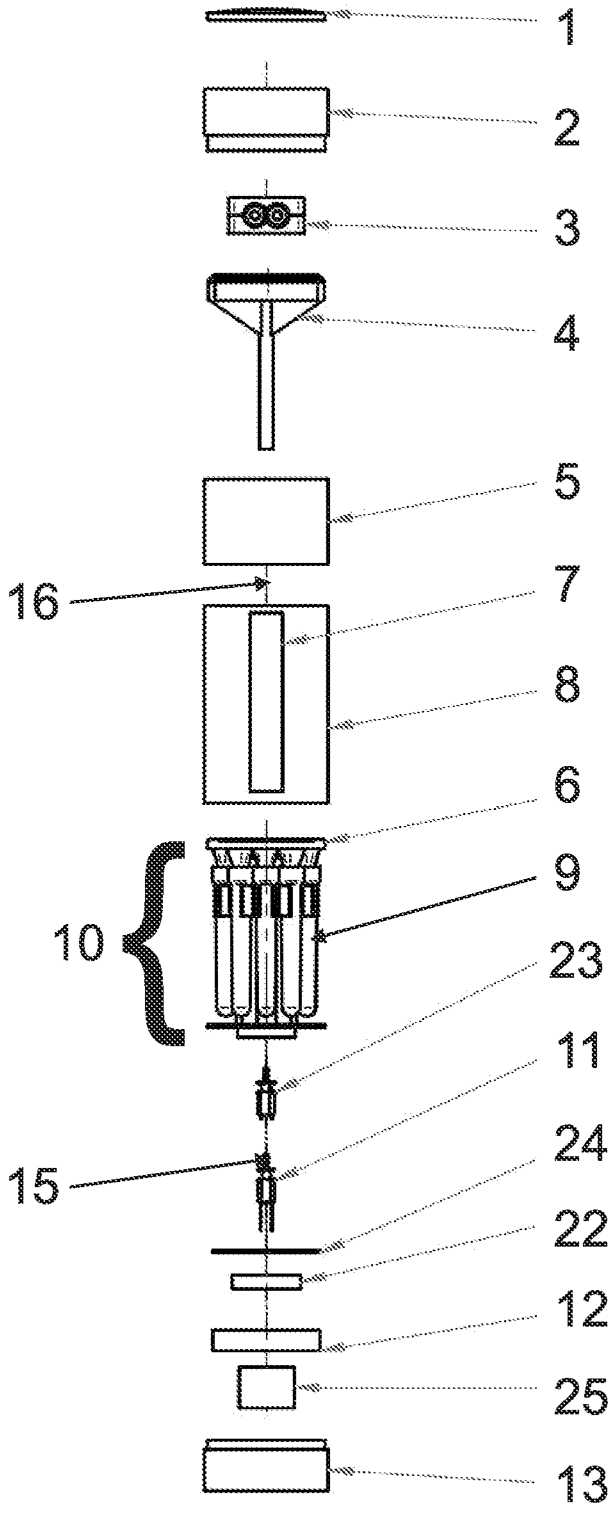

| | | | | |
|---|---|---|---|---|
| 2010/0301806 | A1 | 12/2010 | Ormaza et al. | |
| 2014/0261471 | A1* | 9/2014 | Ruzycky | A47J 42/16 131/108 |
| 2015/0298135 | A1 | 10/2015 | Spielman | |
| 2016/0000143 | A1 | 1/2016 | Wheatley | |
| 2017/0035105 | A1 | 2/2017 | Jordan | |
| 2017/0297033 | A1* | 10/2017 | Li | B02C 18/24 |

FOREIGN PATENT DOCUMENTS

| | | | |
|---|---|---|---|
| CN | 204032372 | U | 12/2014 |
| KR | 101730333 | B1 | 4/2017 |

* cited by examiner

DEVICE FOR GRINDING AND MIXING OF HERBS AND/OR TOBACCO AND/OR SPICES, PREPARING AND DISPENSING OF PAPER CONES AND METHOD FOR THE APPLICATION THEREOF

The subject of the invention is a device for grinding and mixing of herbs and/or tobacco and/or spices, preparing and dispensing of paper cones. The subject of the invention is also the method for the application of the device.

The state of the art includes the following solutions. South-Korean patent application no. KR101730333 B1 discloses a cigarette manufacturing apparatus including a tobacco leaf supply unit, a cutter unit to cut the tobacco leaves, and a cigarette production unit. The invention is also equipped with a pressurizing rod for pressurizing the supplied tobacco leaves, and a finishing rod for closing the tip of the packed tobacco after pressurization. The disadvantage of the solution is the size of the apparatus and the fact that the apparatus is not portable.

As customers show growing interest in self-made tobacco articles, many patents are disclosing kits and devices for home-made cigarette production. U.S. Pat. No. 6,041,921 A discloses a portable, foldable wallet-like kit for storing smoking apparatus including a storage unit for tobacco and accessories for manually making cigarettes. The invention does not have a grinder unit and the process of making the cigarettes is not automated.

The US patent application no. US2017035105 A1 describes a portable smoking utensil holder and kit. The holder can store and grind the tobacco leaves, and a built-in or a removable lighter is optionally included in the kit. According to the description, additional utensils may be stored within the utensil holder, such as picks or pipe. The device may have audio effects corresponding with the particular action being performed. However, the device is not able to fill or roll cigarettes.

U.S. Pat. No. 9,565,972 B1 discloses a small sized portable grinder for herbs, coffee, tobacco, etc. The grinder can optionally host a storage unit to store the shredded tobacco. The device can be charged through a USB port. The grinder may also be equipped with lighting means. This device also does not offer a solution to properly mix the different ground herbs and fill them in a cigarette.

Another rechargeable electric herb grinder is described in US patent application no. US2010301806 A1. In the housing of the electric grinder several compartments are formed, and the compartments are attachable to each other along a separating joint. The portable device can be charged via a USB port or alternatively, adapters for wall power outlets and car power outlets/cigarette lighters can be utilized to provide the external power. This grinder device also can not mix the ground herbs or fill cigarette cones. A similar device with the same disadvantage is disclosed in the utility model no. CN204032372 U, introducing a portable tobacco grinder having a cylindrical outer shell with storage functions.

An easy-to-use electric tobacco grinding device is disclosed in Chinese utility model no. CN201135126 Y. The transparent cover of the device enables inspection of the grinding process. This tobacco grinder has the same disadvantages not being able to mix the ground herbs and fill the cigarette cones.

The US patent application no. US2016000143 A1 introduces a smoking kit hidden in a toy, namely a bear-shaped figure. The inside of the toy consists of several compartments that can store, preserve, and grind tobacco. The invention is provided with a hollow outer case, the lower part of the mentioned outer case receives and stores the paper roll, tobacco, grinder and cooling tray. This device also lacks functions such as mixing the ground herbs or preparing cigarettes.

The Chinese utility model no. CN203194527 U discloses a multi-functional cigarette holder including a tobacco reservoir. The device can optionally include a grinder and it is able to roll cigarettes, but only one cigarette at a time.

The US patent application no. US2015298135 A1 describes a device closest to the present invention. The said US patent discloses a grinding apparatus for tobacco to satisfy the need for hand-made and custom-made tobacco and related products. The device can store the ground tobacco and fill cigarette cones with it. The disadvantage of this invention is that it does not make precise filling possible. Furthermore, another disadvantage is that every step has to be started manually and that the device cannot mix the herbs properly.

The US patent application publication no. US 2014/0261471 discloses a grinder apparatus with a cigarette filler component. The reference discloses that a chamber including pre-formed tubes is removable from the apparatus, but fails to disclose that a grinder/mixing unit is removable from the apparatus. With this apparatus, if ground material remains in the grinder portion and the user wishes to grind a new or different material, the user does not have a convenient means of removing the ground material from the device other than filling additional pre-formed tubes.

Many solutions in the prior art are able to grind various herbs, but cannot mix the herbs properly or fill paper cones, such as cigarette cones, and roll cigarettes. The devices that have cigarette rolling functions require quite a lot user interaction along the process.

The problem to be solved is to avoid as many user interactions as possible from the process of making cigarettes or the like and create said device. The device to be created is able to store, grind and mix herbs and/or tobacco and/or spices, fill multiple paper cones to prepare ready cigarettes or other paper containers of herbs/spices for cooking, for example, and dispense the paper cones to the user with a single press of a button. The term "cigarette" is used herein for convenience, but it should be understood that any reference to "cigarette," in addition to its ordinary and customary meaning, further includes paper cones filled with only with herbs and/or spices that can be used as containers for the herbs and/or spices for, for example, cooking purposes.

The purpose of the invention is to eliminate the faults of known solutions and to provide a compact, easy-to-use device for making ready paper cones from herbs and/or tobacco and/or spices.

The inventive step is based on the recognition that it is advantageous to automate every single step of a hand-made or hand-rolled paper cone including grinding herbs/spices/tobacco, mixing them properly and filling the mixed herbs into pre-rolled paper cones placed in tubes and also dispensing the ready paper cones to the user.

The presented device has numerous advantages. The device reduces user interaction, as it can be operated by a single press of a button, and then the device grinds and mixes the herbs/spices/tobacco, and fills the pre-rolled cigarette papers placed in the tubes and dispenses the ready cigarettes. Instead of a button, the device can be controlled through a user interface of a mobile application or software, which makes the use of the device even more convenient. Controlling the device through wireless connection, for example Bluetooth is also possible. Through such a user interface, the user can also monitor his or her consumption. Furthermore, the device can be equipped with safety measures, such as a child lock to prevent children to reach the content of the device, or the device can include a time lock to prevent too frequent use. As such, this aesthetically designed device can be a great help for someone in the way of quitting smoking. The device is chargeable and portable, and also has the advantage of being protected from total dust ingress and water spray from any direction. The device may also comprise a display for displaying all the necessary information such as time, status of power supply, the number of filled tubes, the weight of the herbs/spices/tobacco inside one of the chambers, etc. The tubes are removable for easy storage of the prepared cigarettes for portability.

The solution in general is a device for grinding and mixing of herbs and/or tobacco and/or spices, preparing and dispensing of cigarettes, the device comprising a grinding chamber for holding and grinding the herbs and/or tobacco and/or spices, wherein the grinding chamber has a top, a plurality of tubes for holding pre-rolled cigarette papers and receiving ground herbs and/or tobacco and/or spices, a carousel, which is rotatable around a central axis and is located within carousel cover, the grinding chamber is equipped with a grinder unit, the grinder unit is connected to a motor, the motor being capable of driving the grinder unit, a tray for delivering the ground herbs and/or tobacco and/or spices into pre-rolled cigarette papers placed in one tube or in plurality of tubes, the tray is located above the carousel, a power supply connected to the motor, said power supply is located in a bottom cover, A feature of the invention is that the device further comprises a mixing chamber for mixing and storing the ground herbs and/or tobacco and/or spices, which is located below the grinding chamber, a mixing unit located in the mixing chamber and connected to the motor via a drive shaft, at least one door on the carousel cover for dispensing one tube or a plurality of tubes with the filled pre-rolled cigarette paper, wherein the carousel comprises a plurality of tube holders for holding the tubes, the tray is located below the mixing chamber, the carousel cover is mounted on the bottom cover, the mixing chamber is mounted on the carousel cover, the grinding chamber is mounted on the mixing chamber.

In another implementation form, the grinder unit is equipped with at least two grinding gears, the grinder unit and/or the mixing unit is connected to a controlling unit for controlling the operation of the grinder unit and/or the mixing unit; the controlling unit is placed below the motor and/or the controlling unit is a wirelessly connected software or application and/or the controlling unit is a button or connected to a button located on the mixing chamber.

In a different embodiment, the mixing unit comprises a nozzle, the tray comprises at least one cone for accommodating the nozzle.

In another embodiment, the number of tube holders placed in the carousel is between 2-20, preferably ten; the number of tubes is equal or less than the number of tube holders in the carousel. In other embodiments the number of tube holders and tubes can be even more than twenty.

In another possible embodiment, the diameter of the tubes is 5-40 mm, preferably 10-24 mm; the length of the tubes is 5-20 cm, the maximum length preferably being 11 cm; the height of the carousel is equal or more than the length of the tubes. In other embodiments the diameter and the length of the tube can be even more. When preparing cigarettes with less herbs/tobacco/spices in it, it is also possible to use shorter tubes as well. The device makes it possible to prepare shorter and longer cigarettes at the same time, using different sizes of tubes in the carousel at the same time.

In a different embodiment, the top is removably connected to the grinding chamber and/or the top comprises a button. As an example, the top can be connected to the grinding chamber with a hinge.

In another possible embodiment, the grinding chamber and/or the mixing chamber and/or the carousel is equipped with a scale.

In another possible embodiment, the carousel is equipped with a vibrating element and/or a carousel motor, the carousel is driven by the carousel motor.

In another implementation form, the device further comprises a display preferably placed on the bottom cover.

The general application of the invention includes the steps of adding herbs and/or tobacco and/or spices to the grinding chamber, grinding said herbs and/or tobacco and/or spices with the grinder unit, placing pre-rolled cigarette papers into one tube or in plurality of tubes, forwarding the ground herbs and/or tobacco and/or spices to the carousel and filling at least one pre-rolled cigarette paper with the ground herbs and/or tobacco and/or spices. The feature of the general method is that after grinding and before forwarding the ground herbs and/or tobacco and/or spices to the carousel the method further includes the steps of forwarding the ground herbs and/or tobacco and/or spices to the mixing chamber, and then mixing the ground herbs and/or tobacco and/or spices with the mixing unit in the mixing chamber thus creating a mixture, after filling at least one pre-rolled cigarette paper with the mixture, the method further continues with the steps of rotating the carousel around the central axis to move one or more tubes with the filled pre-rolled cigarette papers to at least one door, and then dispensing said one or more tubes with the filled pre-rolled cigarette papers through one or more doors. Filling might mean filling fully or also filling partially. The carousel can rotate with or without the tray.

Another feature of the method may be that it further includes the steps of controlling the operation of the grinder unit and/or the mixing unit with controlling unit, and setting the speed of mixing unit and/or grinder unit with the controlling unit.

Another feature of the method may be that after dispensing one or more tubes with the filled pre-rolled cigarette papers, the method continues with grinding the remaining herbs and/or tobacco and/or spices in the grinding chamber with the grinder unit.

The method may further include the step of stopping the grinder unit when the mixing chamber is full.

Another different feature of the method may be that after filling at least one pre-rolled cigarette paper with the mixture, it further includes the step of compressing said mixture in at least one pre-rolled cigarette paper and/or vibrating at least one tube with the vibrating element.

Another possible feature of the method may be that it further includes the step of measuring the weight of the herbs and/or tobacco and/or spices placed in the grinding chamber and/or the weight of the mixture in the mixing chamber and/or the weight of the mixture filled in the pre-rolled cigarette papers.

In accordance with an additional aspect, a device for grinding and mixing of herbs and/or tobacco and/or spices, preparing and dispensing of cigarettes, includes a grinding chamber, a mixing chamber, a tray, a carousel and a power supply. The grinding chamber holds and grinds the herbs and/or tobacco and/or spices, and has a top. The grinding chamber is equipped with a grinder unit, the grinder unit is connected to a motor, the motor being configured to drive the grinder unit. Further, the grinding chamber is mounted on the mixing chamber. The mixing chamber is below the grinding chamber and mixes and stores the ground herbs and/or tobacco and/or spices. The mixing chamber includes a mixing unit that is located in the mixing chamber and is connected to the motor via a drive shaft. The tray is located below the mixing chamber and delivers the ground herbs and/or tobacco and/or spices into at least one tube of a plurality of tubes for holding the pre-rolled cigarette papers and receives ground herbs and/or tobacco and/or spices. The carousel is located below the tray, is rotatable around a central axis and is located within a carousel cover. The carousel includes a plurality of tube holders for holding the plurality of tubes. The mixing chamber is mounted on the carousel cover, and at least one door is on the carousel cover and dispenses the tube with the filled pre-rolled cigarette paper. The power supply is connected to the motor and is located in a bottom cover on which the carousel cover is mounted. The grinding chamber and the mixing chamber are coupled such that the grinding chamber and the mixing chamber are extractable from the device as a single unit.

In accordance with one exemplary embodiment, the motor is configured to operate in a forward direction and in a reverse direction. When the motor operates in the forward direction, both the mixing unit and the grinder unit are driven by the motor. In turn, when the motor operates in the reverse direction, the mixing unit ceases mixing and the grinder unit is driven by the motor.

According to another exemplary embodiment, the single unit comprises a coupler that is configured to attach to the drive shaft when coupled to the device and, when extracted from the device, to attach to an additional motor that is configured to dispense the ground herbs and/or tobacco and/or spices.

In another exemplary embodiment, a removable sieve is disposed between the grinding chamber and the mixing chamber, where the sieve is configured to be switched out of the device to enable the transfer of the herbs and/or tobacco and/or spices from the grinding chamber to the mixing chamber at different granularity levels.

According to an additional embodiment, the tube comprises a ferromagnetic ring disposed on a top of the tube and the carousel cover and/or the tray comprises a magnetic mechanism configured to interact with the ring and seal the tube during the delivery of the ground herbs and/or tobacco and/or spices. The ferromagnetic ring can be a metal that is influenced by a magnet, or the ring can itself be magnetic. Similarly, the tray can have a metal, where the ring of the tube is magnetic, or can have a magnet that influences a metal ring of the tube.

In accordance with an exemplary embodiment, the tube is configured such that a pre-rolled cigarette paper is disposable within the tube such that the paper is completely submerged in the tube. Here, the tube is composed of movable parts and comprises an internal spring.

According to another exemplary embodiment, the device further comprises a controller configured to control at least one operation of the device and a user interface. In an implementation of this embodiment, the device includes a light sensor, and the tube includes an aperture enabling the light sensor to detect when the tube is filled with the ground herbs and/or tobacco and/or spices. Further, the controller is configured to receive a signal from the light sensor indicating that the tube is filled with the ground herbs and/or tobacco and/or spices, and the controller is configured to close a nozzle in the mixing chamber in response to receipt of the signal.

In another implementation of this embodiment, the device further includes a dehumidifying pack or a humidification pack and a humidity sensor. The humidity sensor is configured to measure humidity within the device and to indicate to the controller that the humidity has passed or has fallen below a threshold. In addition, the controller is configured to indicate to a user through the user interface that the dehumidifying pack or the humidification pack should be changed.

An additional implementation of this embodiment includes a tag reader configured to read a tag from a package of the herbs and/or tobacco and/or spices and transmit read data to the controller, where the controller is configured to receive information about the herbs and/or tobacco and/or spices through the network.

In a further implementation of this embodiment, the controller is configured to receive and/or transmit data on a communication network external from said device. In accordance with an exemplary feature of this implementation, the controller is configured to control the operation based on the information. According to an additional feature, the operation includes managing a speed and/or duration of the grinding and/or the mixing.

According to another exemplary embodiment, the device includes a lighting unit configured to output light having wavelengths that prevent and/or identify mold formation.

In accordance with another exemplary aspect, a system for grinding and mixing of herbs and/or tobacco and/or spices, preparing and dispensing of cigarettes, includes the device and a container. The container is configured to be coupled to the single unit when extracted, and the container or the single unit includes a controller configured to receive and/or transmit data on a communication network external from the device.

According to an additional exemplary aspect, a method for utilizing the device includes adding herbs and/or tobacco and/or spices to the grinding chamber; grinding the herbs and/or tobacco and/or spices with the grinder unit; forwarding the ground herbs and/or tobacco and/or spices to the mixing chamber, and mixing the ground herbs and/or tobacco and/or spices with the mixing unit in the mixing chamber thus creating a mixture; extracting the single unit from the device, where the single unit comprises a coupler that is configured to removably attach to the drive shaft when coupled to the device; and coupling the coupler of the single unit to a container for storage, where the container or the single unit comprises a controller configured to receive and/or transmit data on a communication network external from the device.

Figure 4:
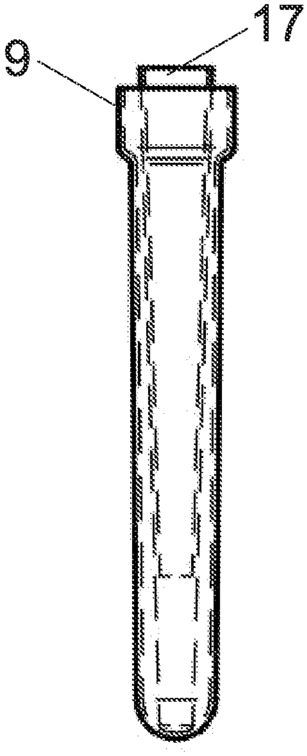
Figure 5:
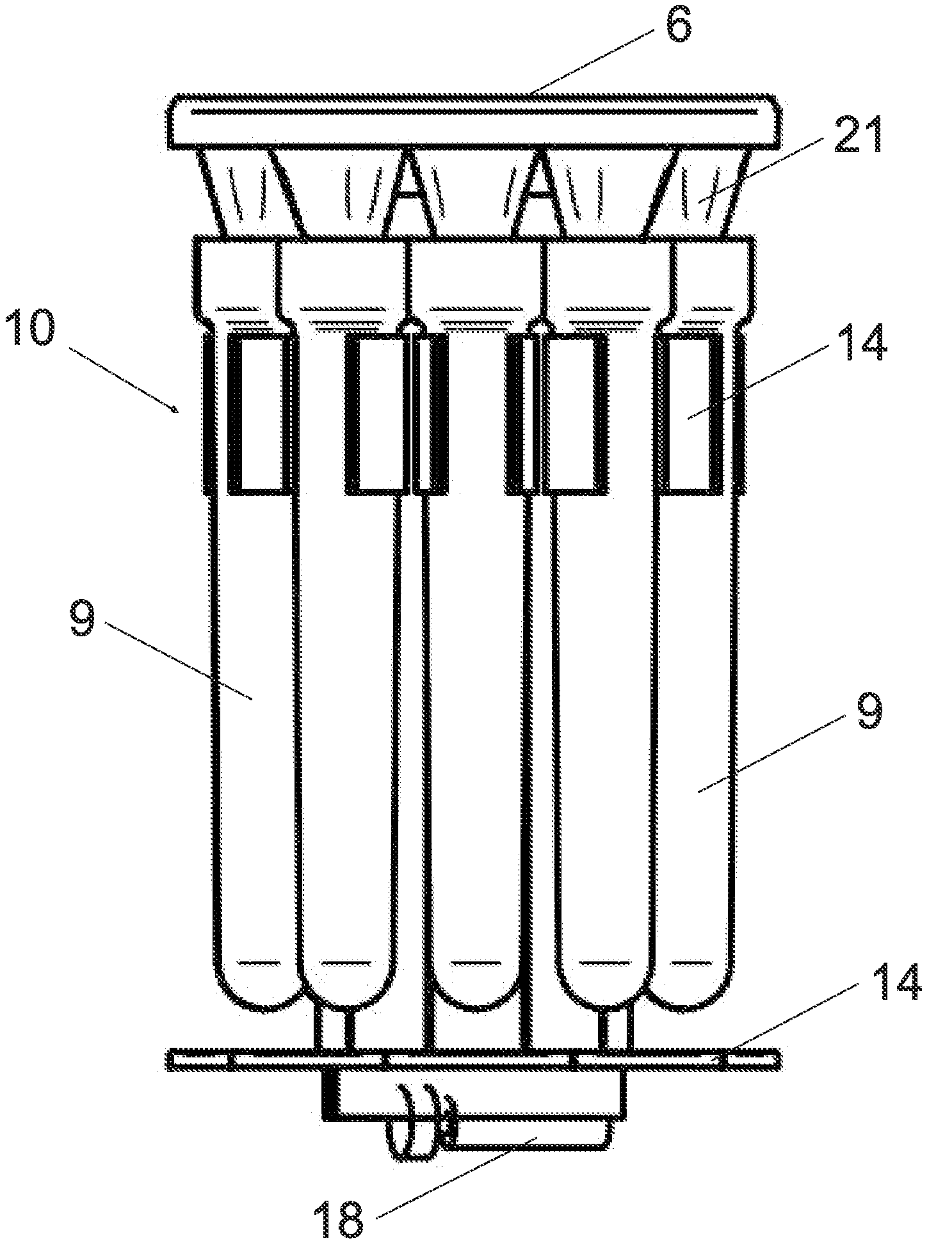
Figure 6:
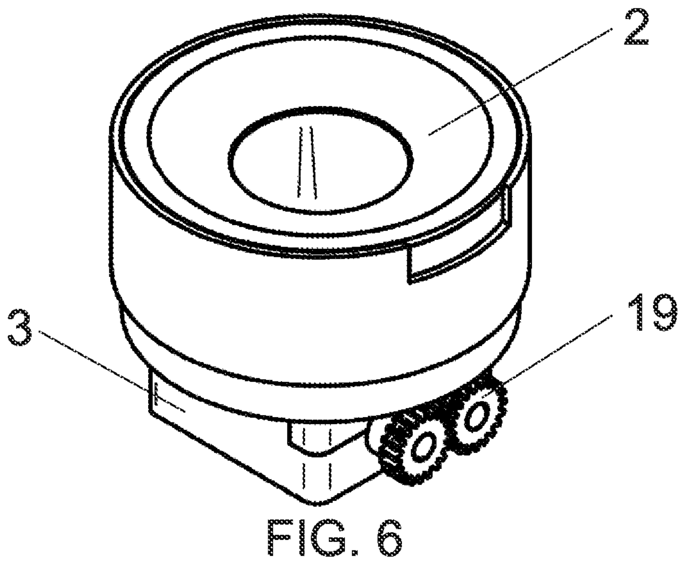
Figure 7:
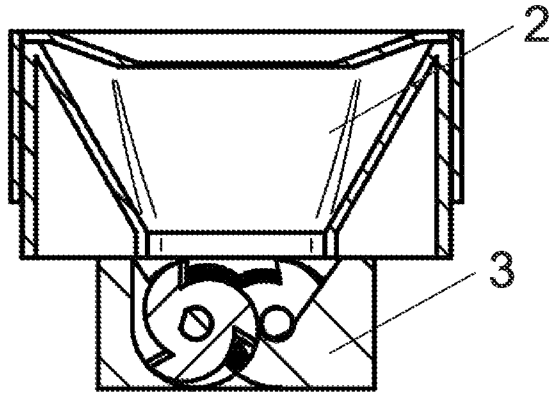
Figure 8:
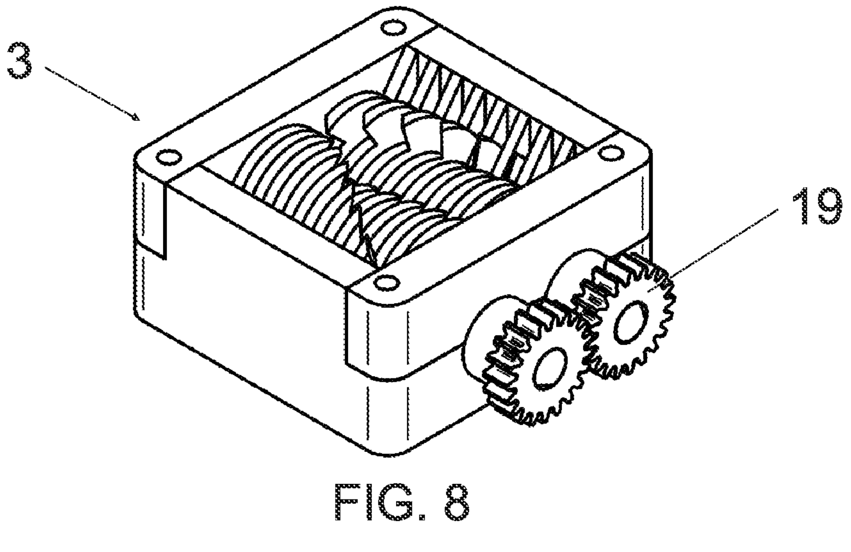
Figure 9:
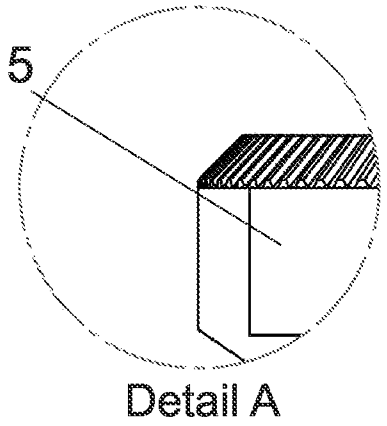
Figure 10:
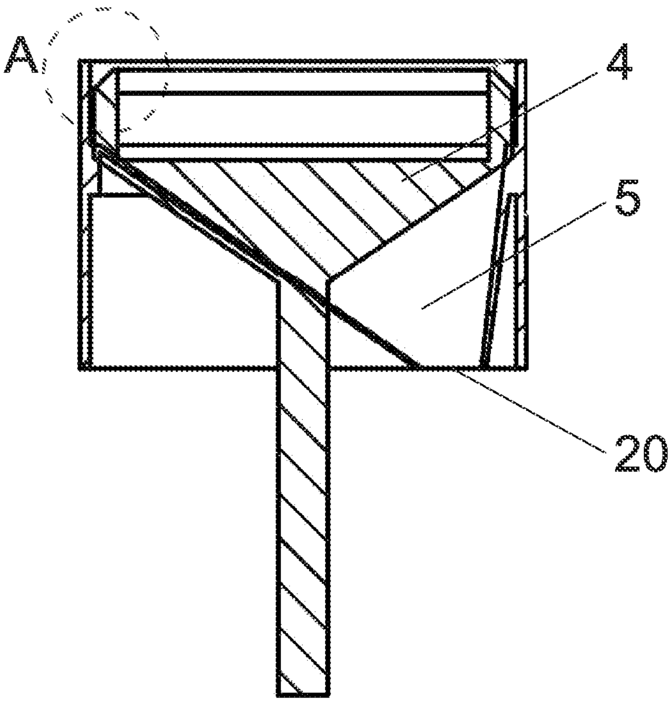
Figure 11:
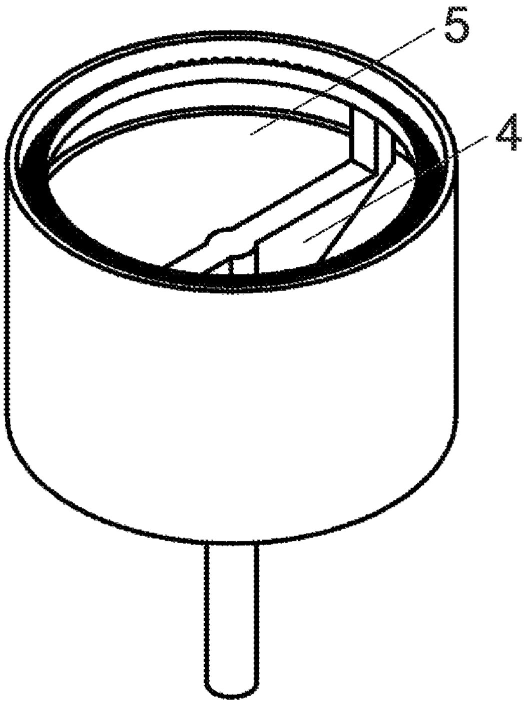
Figure 12:
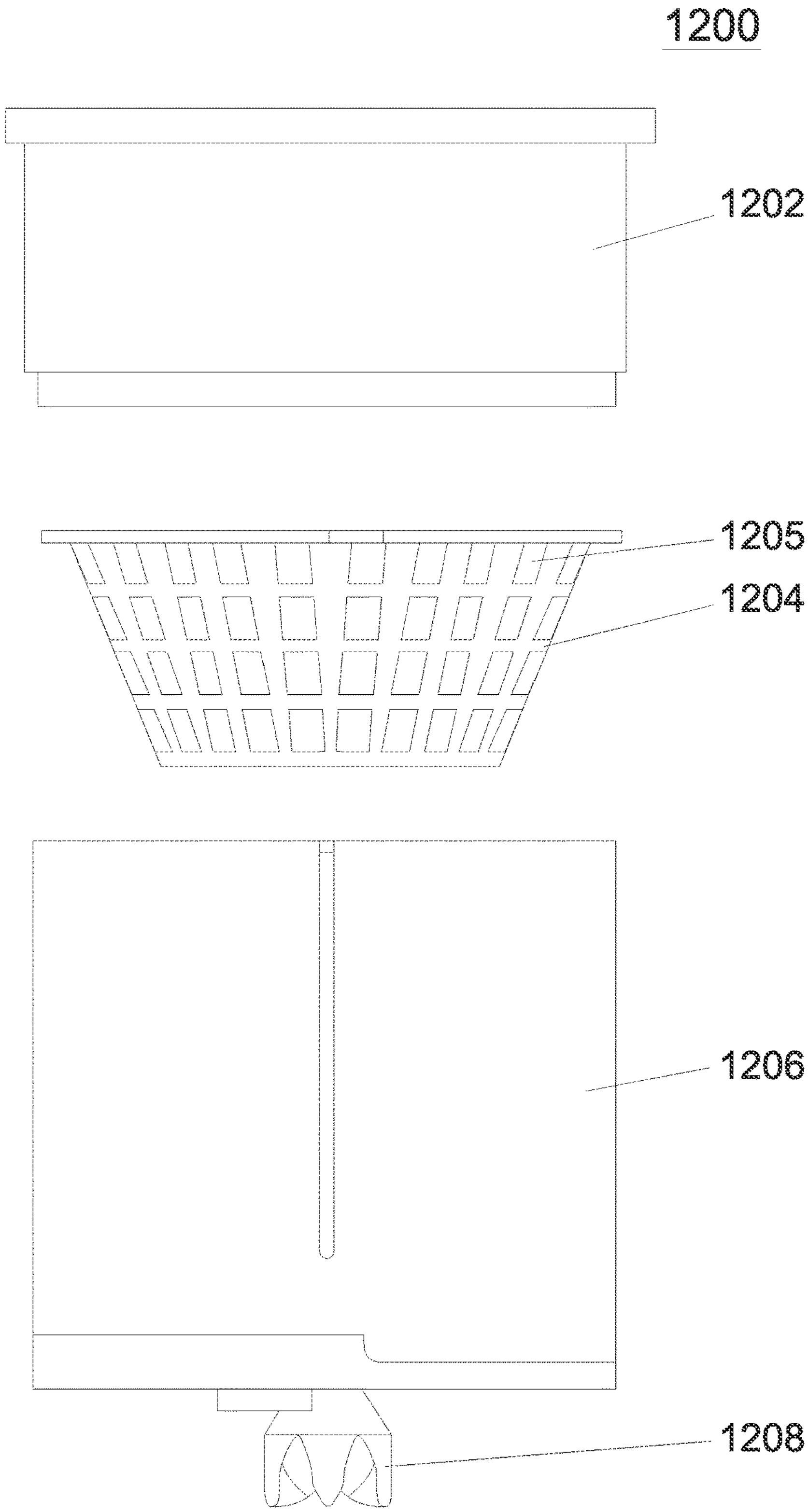
Figure 13:
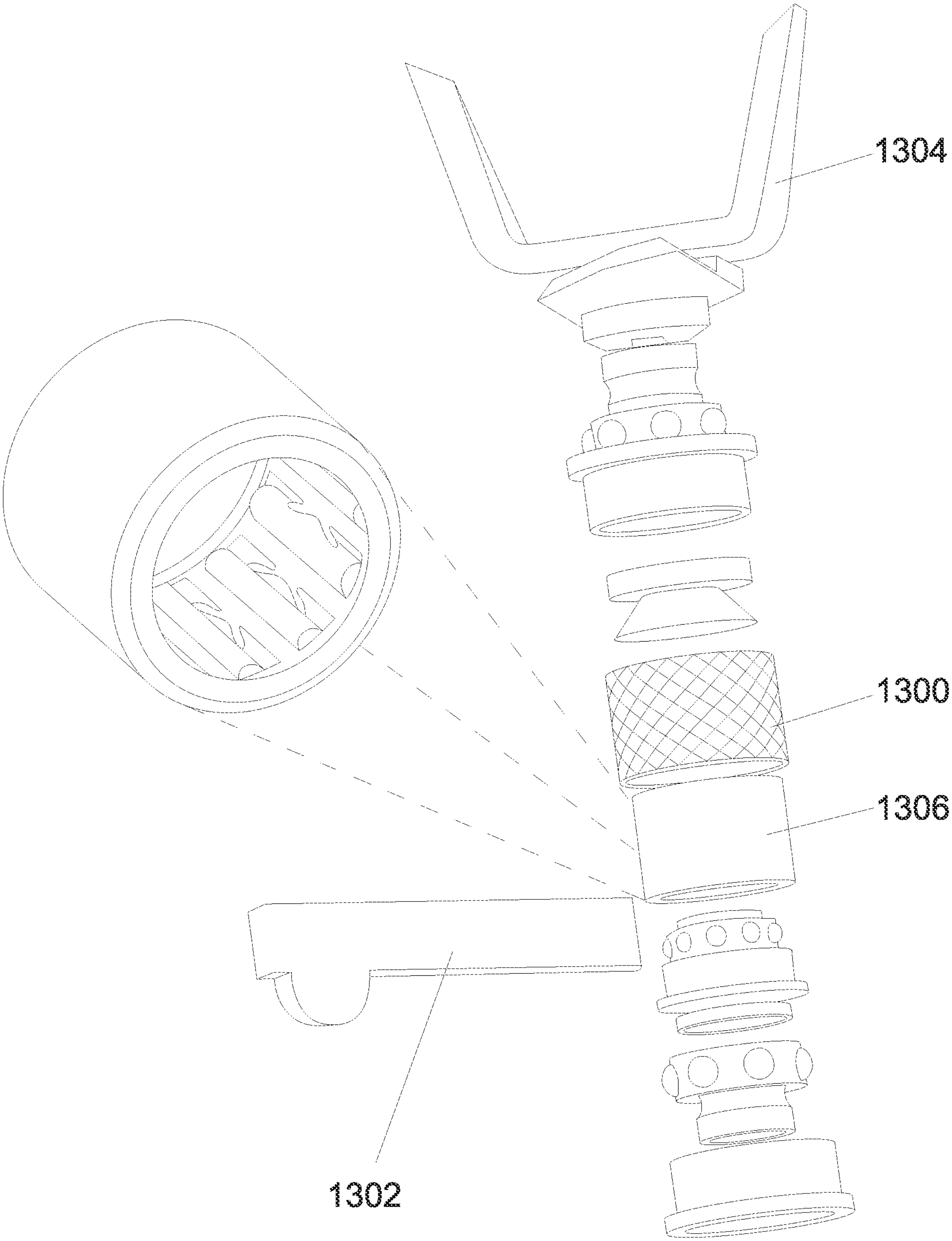
Figure 14A:
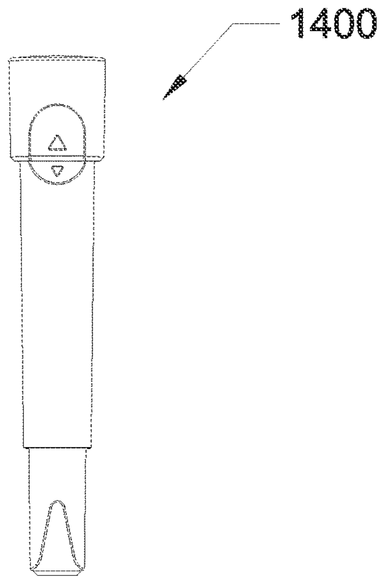
Figure 14B:
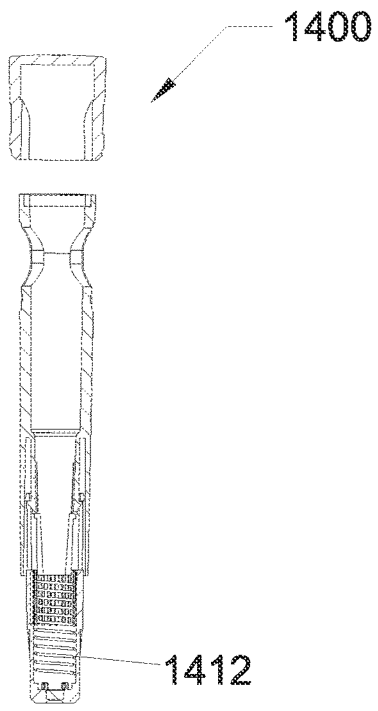
Figure 14C:
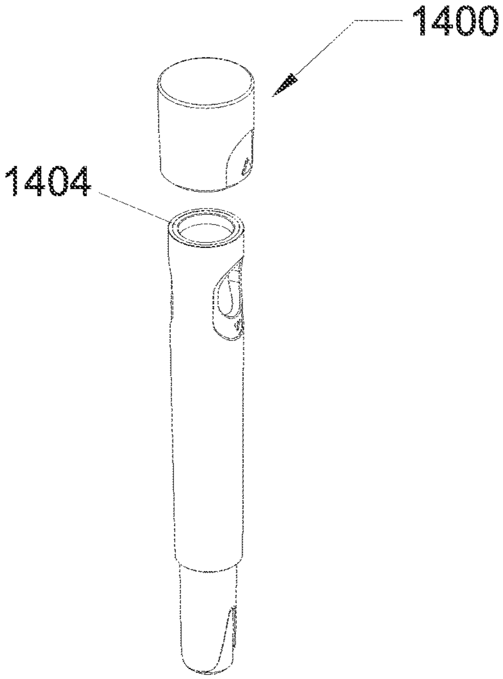
Figure 14D:
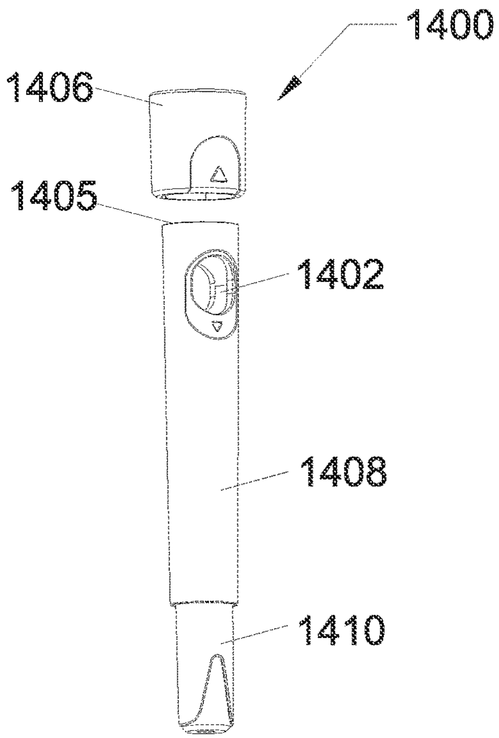
Figure 15A:
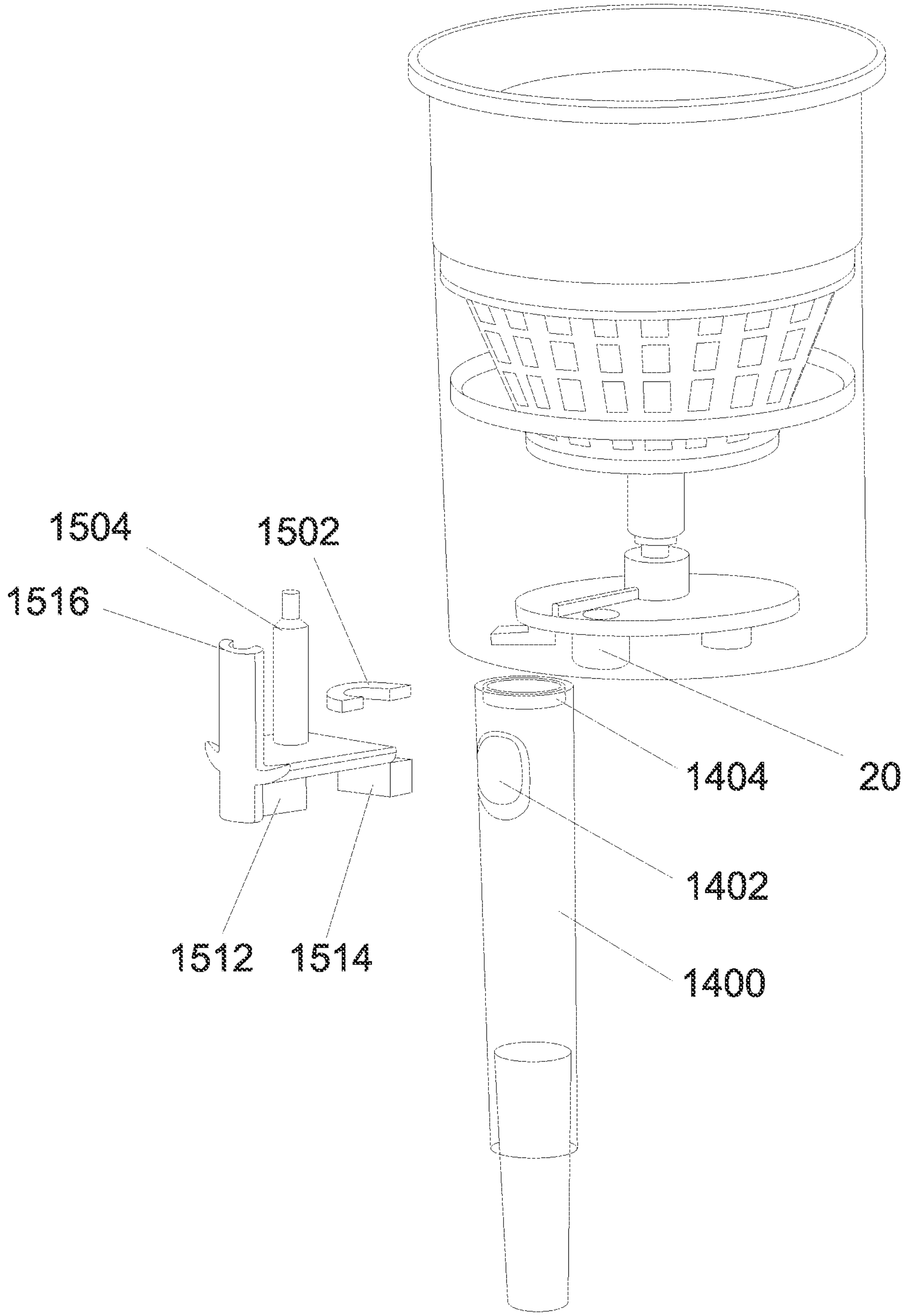
Figure 15B:
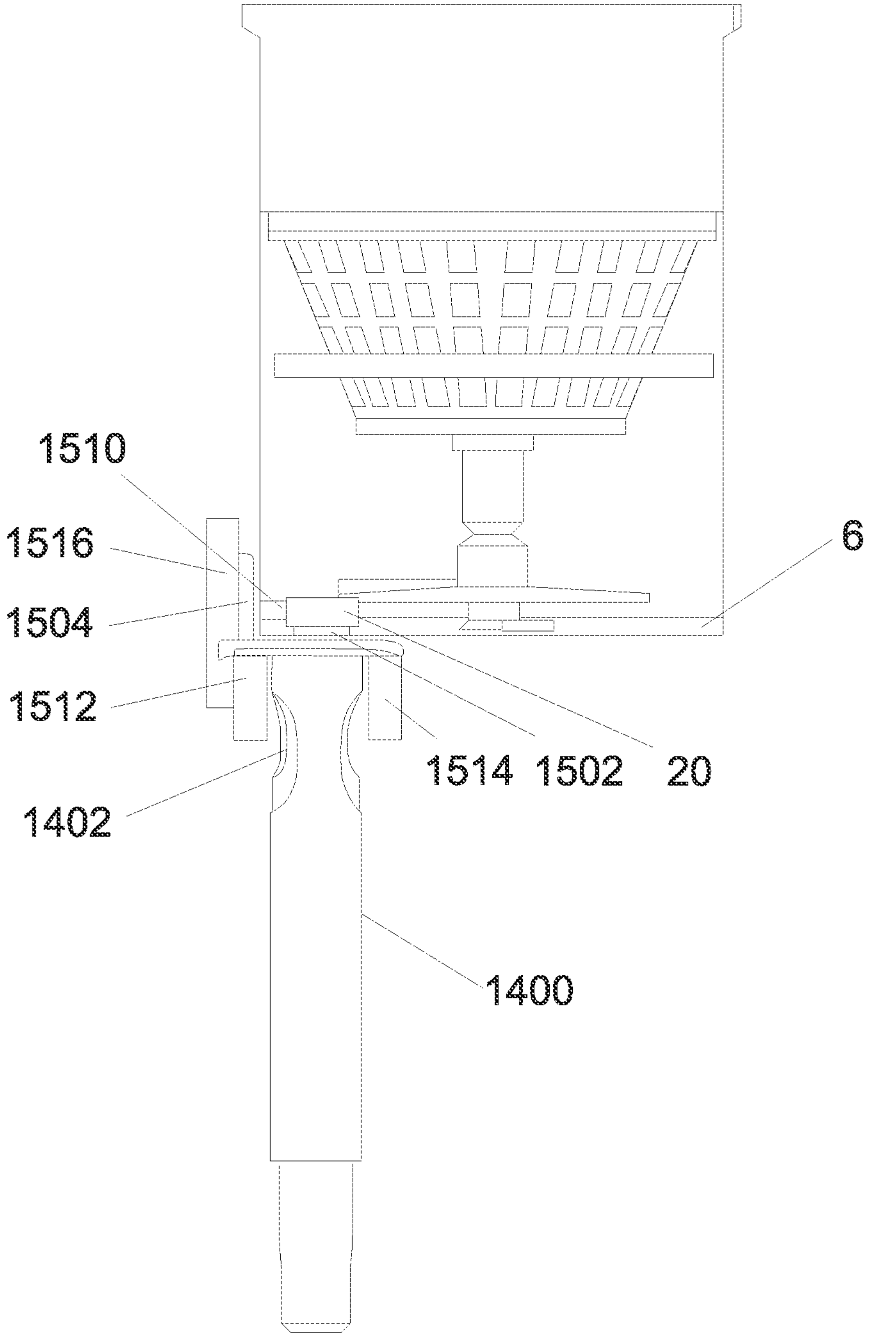
Figure 16A:
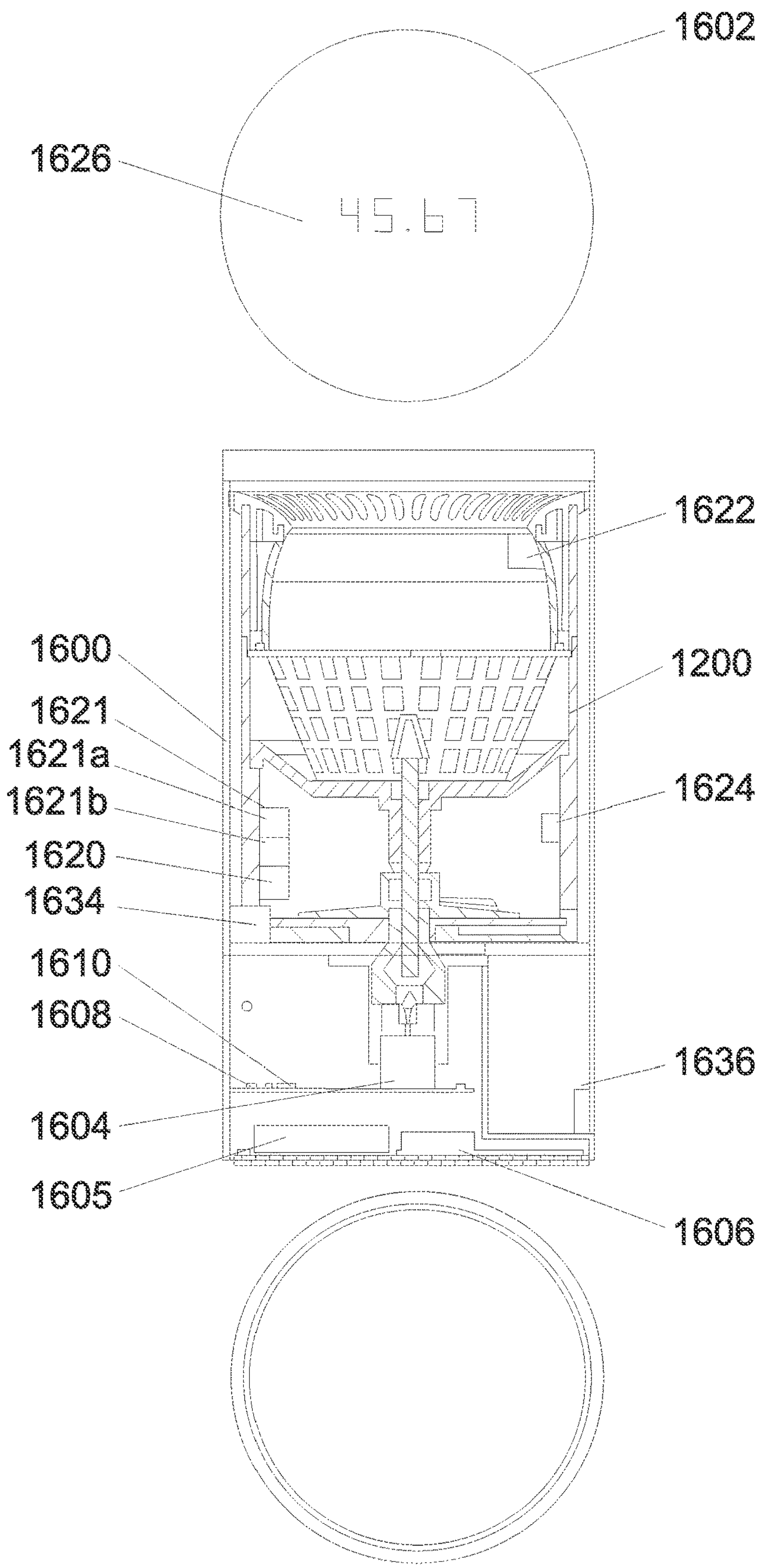
Figure 16B:
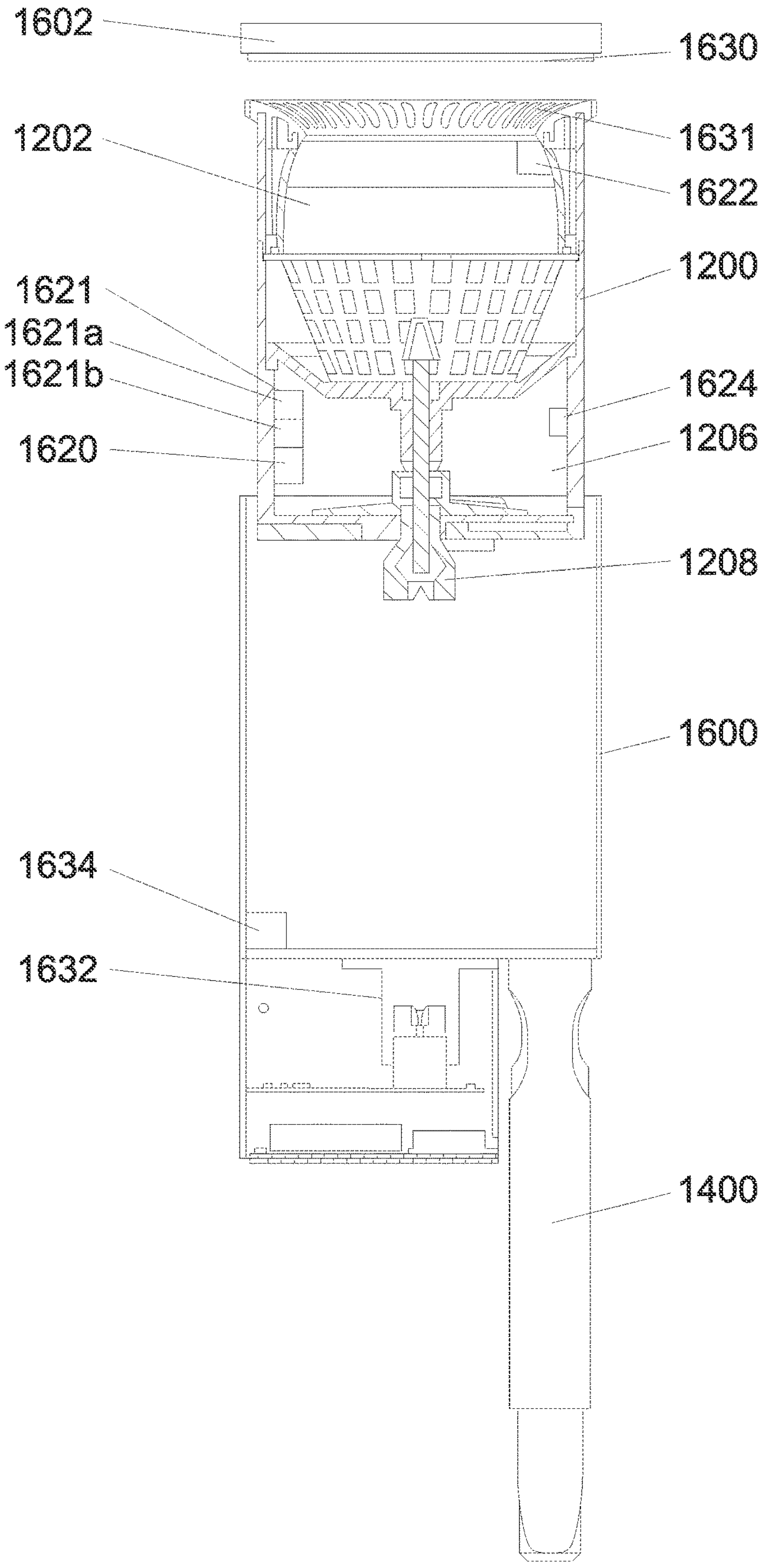

The invention is presented in more detail by examples of implementation, using drawings. On the following drawings, FIG. 1 shows the exploded-view of one embodiment of the device, FIG. 2 shows the perspective view of one embodiment, FIG. 3 shows the details of the carousel, FIG. 4 shows a tube in side-view, FIG. 5 shows the carousel in side-view, FIG. 6 shows a perspective view of the grinding chamber and the grinder unit, FIG. 7 shows a section drawing of the grinding chamber and the grinder unit, FIG. 8 shows a perspective view of the grinder unit, FIG. 9 shows a magnified detail of the mixing unit, FIG. 10 shows a section drawing of the mixing chamber and the mixing unit, FIG. 11 shows a perspective view of the mixing chamber and the mixing unit, FIG. 12 shows an exploded view of a single grinder/mixing unit in accordance with alternative embodiment, FIG. 13 shows an exploded view of an axle/shaft configured to drive a mixing unit and a grinder unit in the alternative embodiment of FIG. 12, FIGS. 14A-D show perspective views of an exemplary tube according to various embodiments, FIGS. 15A-B show a perspective view of a magnetic filling mechanism that utilizes the features of the tube of FIG. 14, and FIGS. 16A-B show a sectional view of a modular design in which the single grinder/mixing unit of the alternative embodiment of FIG. 12 is storable in a separate container.

FIG. 1 is the exploded-view of one embodiment of the device illustrating all major elements of it. Top 1 is the cover of the grinding chamber 2, which can be filled with e.g. herbs, spices or tobacco. Optionally, between the top 1 and the grinding chamber 2 seals can be used to make the device odor proof, and also to preserve the aromas of the herbs/spices/tobacco (hereinafter herbs). Top 1 may be equipped with a button. On the bottom of the grinding chamber 2 there is a grinder unit 3 located to cut or grind the herbs. Under the grinder unit 3 a mixing unit 4 is located to properly mix the ground herbs. The mixing unit 4 is placed in a mixing chamber 5, where the ground and mixed herbs are stored. Preferably the capacity of the grinding chamber 2 and the mixing chamber 5 is similar. Below the mixing chamber 5 a tray 6 is installed. The tray 6 is designed to have several cones or valves 21. The valves 21 help transferring the ground and mixed herbs to pre-rolled cigarette papers 17 in one tube 9 or into a plurality of tubes 9. The tubes 9 are held by the tube holders 14 located in the carousel 10. The carousel 10 is placed in carousel cover 8. According to this embodiment the carousel cover 8 is equipped with one door 7 where the loaded cigarettes are dispensed. In other embodiments the carousel cover 8 can be equipped with more than one door 7. The door 7 can be made of transparent materials for enabling the user to inspect the filling process. Below the carousel 10 a carousel motor 23 is placed to drive the carousel 10. The carousel motor 23 is powered by a power supply 12 and is able to rotate the carousel 10 around the central axis 16. The device includes another motor 11 for driving and rotating the gears of the grinder unit 3 and the mixing unit 4 through drive shaft 15. The motor 11 is powered by a power supply 12 that can be a battery, a rechargeable battery, etc., and is located below the carousel 10 and the carousel motor 23. Below the motor there is a controlling unit 24, which can be equipped with Bluetooth communication tool thus making wireless controlling possible. The controlling unit 24 controls the operation of the grinder unit 3 and/or the mixing unit 4, but the controlling unit 24 might also be a wirelessly connected software or application and/or a button located on the mixing chamber 5. For easier and more precise filling, the grinding chamber 2 and/or the mixing chamber 5 and/or the carousel 10 can be equipped with a scale 22. In this embodiment the scale 22 is located below the controlling unit 24. The scale is also able to measure the exact amount of herbs, with an accuracy of, for example, +/−0.1 gram, used in the process and to be filled into the tubes 9. The scale offers the user consistency in efforts of achieving a specific ratio between multiple herbs inserted into the grinder, for example the user follows a recipe, creating a mixture of 50% one herb and 50% another herb. Sensors may also be applied to make more precise filling possible. On the bottom cover 13 there is a display 25 located for displaying necessary information such as time, status of power supply 12, the number of filled tubes 9, the weight of the herbs/spices/tobacco inside one of the chambers, etc. From the bottom side, the device is closed by a bottom cover 13. The bottom cover 13 covers the motor 11 and the carousel motor 23, the controlling unit 24, the scale 22 and the power supply 12. The top 1, the grinding chamber 2, the mixing chamber 5, the carousel cover 8 and the bottom cover 13 are connected, so these parts are forming the outer shell of the device. The connecting elements can be disconnected from one another for easier maintenance and cleaning, for example by rotating. The connecting elements can be equipped with seals for the device to be odor proof. The device can also be equipped with at least one button to start an action such as grinding or mixing or a series of actions, for example from grinding to filling the tubes with herbs. The device can also include a child lock mechanism for safety reasons. Further embodiments of the device may include indicator lights to show the progress and/or the status of the power supply 12 and/or the amount of the remaining herbs. Display 25 and indicator lights can be used at the same time. Instead of indicator lights, notifications may also be forwarded to the user interface as well through wireless communication.

Figure 2:
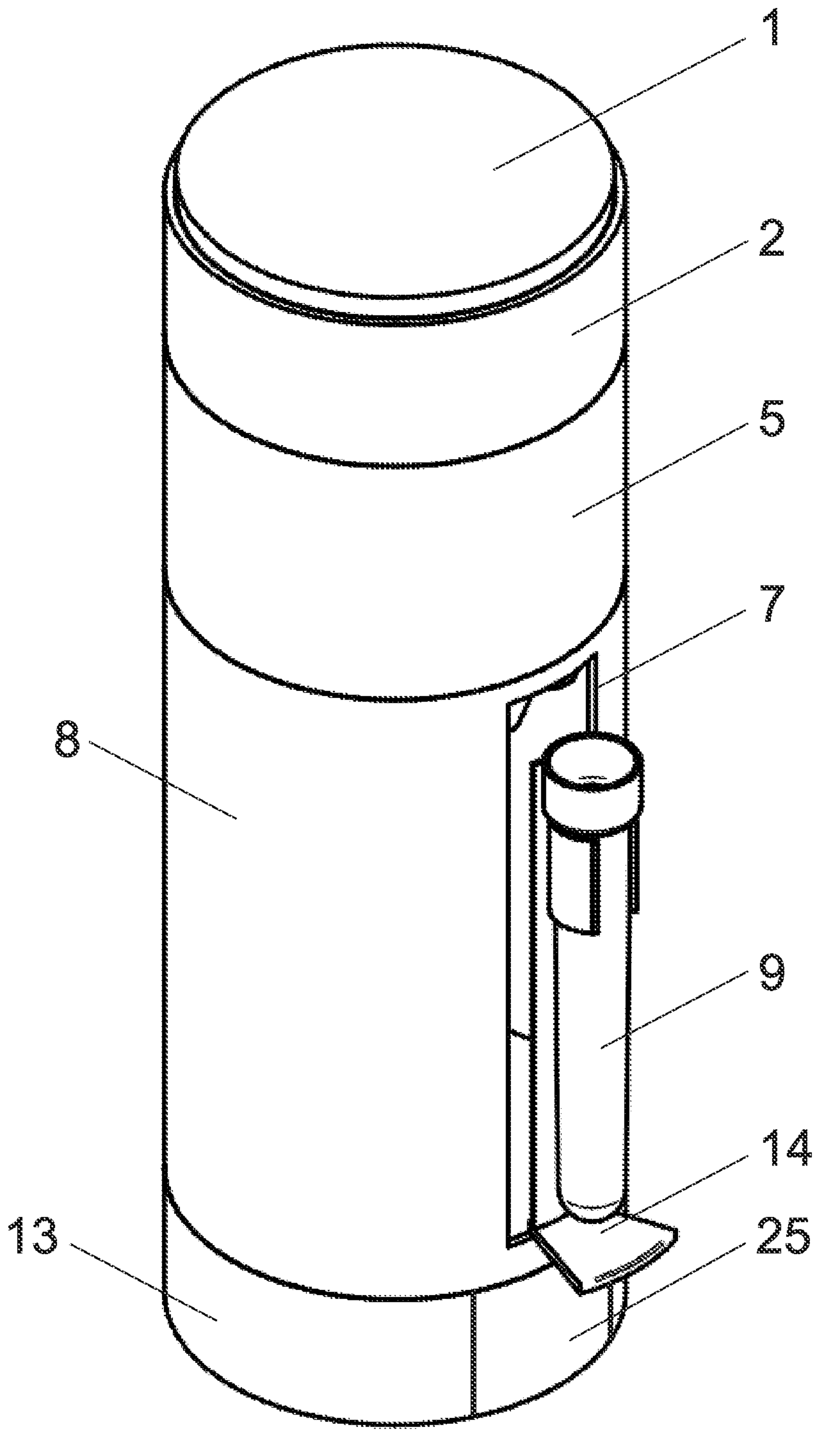

FIG. 2 shows the perspective view of the embodiment of FIG. 1. The outer shell of the device is formed by the top 1, the grinding chamber 2, the mixing chamber 5, the carousel cover 8 and the bottom cover 13, where each part is connected to the neighboring parts. FIG. 2 illustrates the step when a tube 9 is being dispensed through the door 7 of the carousel cover 8. After the tube 9 is dispensed with the at least partially filled pre-rolled cigarette paper 17 in it, the user can take the cigarette out of the tube 9, or take the whole tube 9 and use the tube 9 as a portable storage of the cigarette. The user may also choose not to insert a pre-rolled cigarette paper, and fill the tube 9 directly with the ground mixture and use the tube 9 as a portable storage for the ground mixture. The tube 9 is being held by a tube holder 14. The display 25 is also illustrated on this drawing, the display 25 is on the bottom cover 13 for displaying information to the user.

Figure 3:
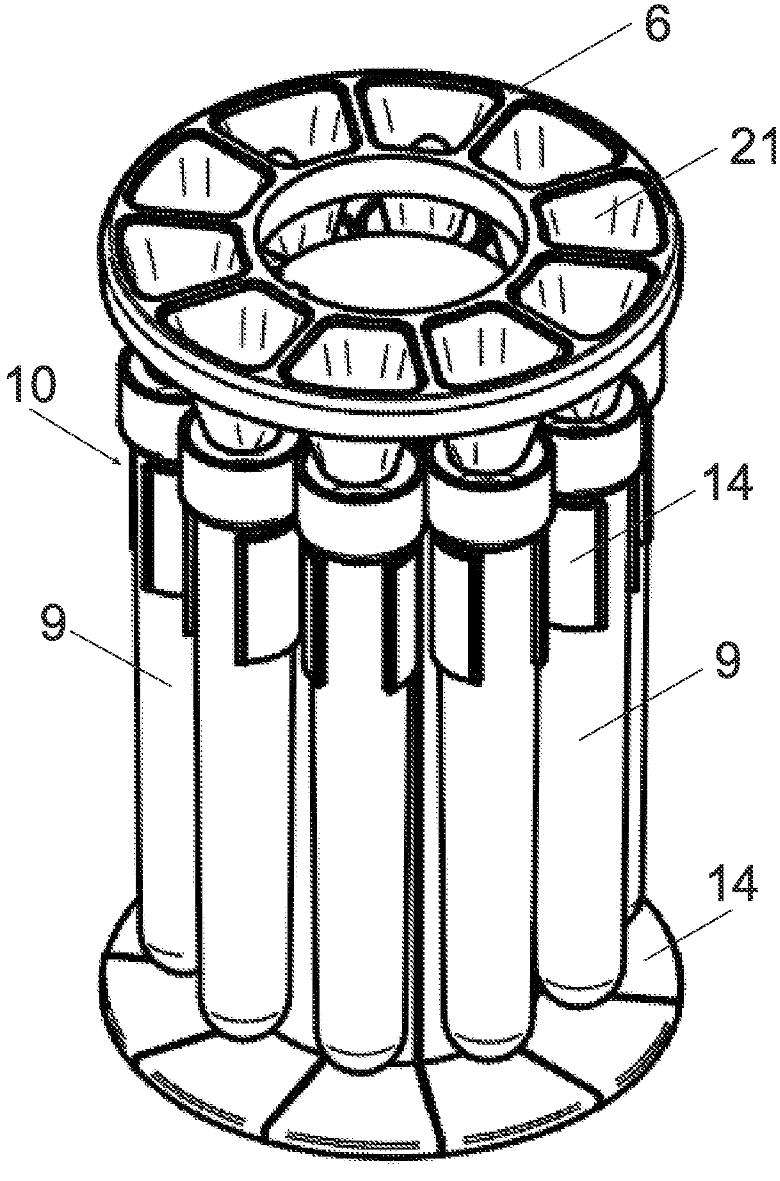

FIG. 3 shows the details of the carousel 10 having ten tubes 9. The carousel 10 has tube holders 14 for holding and moving the tubes 9. One tube holder 14 holds one tube 9. The tube holder 14 can move a tube 9 to the door 7 and then dispense a tube 9 through the door 7 once the pre-rolled cigarette paper 17 placed in the tube 9 is at least partially filled, and optionally shook and/or compressed, and the tube holder 14 moves with the tube 9. The number of tubes 9 being held by tube holders 14 can vary between one and twenty, preferably between two and twenty, but can be even more too. The number of tubes 9 is equal or less than the number of tube holders 14. In the embodiment shown on the drawings there are ten tubes 9 held by ten tube holders 14. Above the tubes 9 there is a ring-shaped tray 6, the tray 6 is placed between the mixing chamber 5 and the carousel 10. The tray 6 comprises at least one cone 21. The embodiment shown on this figure has ten cones 21. The tubes 9 are able to accommodate said cones 21, and the filling process is done through those cones 21. More pre-rolled cigarette papers placed in the tubes 9 may be filled at the same time, but are preferably filled one by one. The tray 6 and the carousel 10 can rotate around central axis 16.

FIG. 4 is the side-view of a tube 9, when a pre-rolled cigarette paper 17 is placed in said tube 9. The pre-rolled cigarette paper 17 may have the shape of a cone or a duct. Placing pre-rolled cigarette paper 17 in the tubes 9 makes it possible to precisely prepare and then dispense a ready cigarette containing any spices, herbs or tobacco in a very short time. The tube 9 may have a cap for closing said tube 9, and the shape of the tube 9 can be cone or a duct. The diameter of the pre-rolled cigarette paper 17 is usually between 5-40 mm, preferably 10-28 mm, but can be even more. The length of the pre-rolled cigarette paper 17 is usually between 84-280 mm, but can also be longer.

FIG. 5 shows the carousel 10 in side-view. As seen on the previous figure, the carousel 10 has tube holders 14 for holding the tubes 9. The embodiment shown on this drawing has ten tube holders 14 and ten tubes 9, and furthermore includes a vibrating element 18 located below the carousel 10 for vibrating the tubes 9, thus shaking the herbs/spices/tobacco in the tubes 9. The vibrating element 18 can be driven by the carousel motor 23. Above the carousel 10 one can see the tray 6 having cones 21 for transferring the mixed and ground herbs/spices/tobacco into one or a plurality of pre-rolled cigarette papers 17 placed in the tubes 9. The diameter of the tubes 9 is 5-40 mm, preferably 10-28 mm, but can be even more; the length of the tubes 9 is 5-20 cm, but can be even more, the standard length preferably being 11 cm. The height of the carousel 10 is equal or more than the length of the tubes 9.

FIG. 6 and FIG. 7 show the grinding chamber 2 and the grinder unit 3, while FIG. 8 shows a perspective view of the grinder unit 3. The grinder unit 3 is equipped with at least two gears 19 and has blades or grinding teeth inside. The grinder unit 3 is connected to the motor 11 through the mixing unit 4 and the drive shaft 15 of the motor 11. The grinder unit 3 is located below the grinding chamber 2, said grinding chamber 2 is capable of holding the herbs/spices/tobacco before grinding them. The grinding chamber 2 may have a removable top cover and might be equipped with a button. The herbs/spices/tobacco fall from the grinding chamber 2 to the grinder unit 3 to be ground, and then the ground herbs/spices/tobacco fall to the mixing chamber 5.

FIG. 9 shows detail A, which is a magnified detail of the mixing unit showing the grinder transmission between the grinder unit 3 and the mixing unit 4. The mixing chamber 5 is also shown on the drawing.

FIGS. 10 and 11 give a closer look of the mixing chamber 5 and the mixing unit 4. The mixing unit 4 mixes the herbs and/or tobacco and/or spices properly. The mixing chamber 5 is located below the grinding chamber 2, and holds similar amount of herbs/spices/tobacco as loaded above in the grinding chamber 2. In essence, ideally, all herbs/spices/tobacco gets ground at the same time to ensure a perfect proportional mix of the different herbs/spices/tobacco put in grinding chamber 2. However, in case there is more herbs/spices/tobacco in the grinding chamber 2 than the capacity of the mixing chamber 5, it is advisable to be more cautious and add the herbs/spices/tobacco to the mixing chamber 5 in more portions, or, when the mixing chamber 5 is full, stopping the grinding process automatically so that no more herbs/spices/tobacco fall into the mixing chamber 5. Then the grinding process can be started again when the mixing chamber 5 is empty again, or when one or more tubes 9 are already filled. The filling can also mean filling partially. The mixing unit 4 is located in the mixing chamber 5 and is connected to the motor 11 via the drive shaft 15 of said motor 11. The mixing unit 4 comprises a nozzle 20, which can be accommodated by a cone 21 of the tray 6. The filling process is being fulfilled through said nozzle 20. In another embodiment, the mixing chamber 5 could have a transparent window for watching the mixture.

The steps of the method for the application of the device are as follows. Firstly, the user may open the top 1 and fill the grinding chamber 2 with selected herbs such as *cannabis*, and/or tobacco and/or spices. Any combination of those is possible. After closing the top 1, the device grinds the herbs and/or tobacco and/or spices with the grinder unit 3. The grinder unit 3 has grinding teeth or blades for this purpose and is located below the grinding chamber 2. The grinder unit 3 is operated by the motor 11. The grinding can start at a press of a button, or in some embodiments grinding can be initiated through wireless connection for example by software or a mobile application. After grinding the ground herbs and/or tobacco and/or spices fall into the mixing chamber 5, where the mixing unit 4 properly mixes the herbs and/or tobacco and/or spices. When the mixing chamber 5 is full, the grinder unit 3 automatically stops grinding. When the level of the mixed herbs and/or tobacco and/or spices (hereinafter mixture) reduces in the mixing chamber 5, the grinding starts again automatically. The process of mixing can start automatically after grinding or be initiated by separate user interaction, for example by pushing a button, or by closing the grinding chamber 2 with the top 1, or by instructing the mixing unit 4 with the controlling unit 24. The speed of the grinder unit 3 and/or the mixing unit 4 may be set and may be changed with a controlling unit 24. The mixture is stored in the mixing chamber 5, ready to be used for filling. Before performing the next step, which is the filling, it is necessary to place as many pre-rolled cigarette papers 17 into as many tubes 9, as many cigarettes the user would like to prepare. The process of filling the pre-rolled cigarette papers 17 placed in the tubes 9 can be started by user interaction, and the user can indicate the amount of cigarettes or joints to be filled from one to the maximum capacity of the device. In the embodiment of FIG. 1 the maximum capacity at the same time is ten cigarettes. When filling the pre-rolled cigarette papers 17 placed in the tubes 9 it is possible to fill them only partially, for example by halving the amount of herbs and/or tobacco and/or spices. For this reason, the user can also use shorter tubes 9; or additional sensors for sensing when to stop the filling of the pre-rolled cigarette papers 17 in the normal sized tubes 9. The user interaction can be a press of a button or a command through a wireless communication by software or mobile application, or an instruction from the controlling unit. Once the filling process is initiated, the mixture is loaded into one or more pre-rolled cigarette papers 17 placed in the tubes 9. In one embodiment the device can only load one tube 9 at a time, then if more cigarettes have to be filled, the carousel motor 23 rotates the carousel 10, so after one pre-rolled cigarette paper in one tube 9 is filled, an empty tube 9 with an empty pre-rolled cigarette paper 17 inside is rotated below the cone 21 of the tray 6. The rotation continues till the selected amount of tubes 9 is properly and at least partially filled. Depending on the purpose, the tray 6 and the carousel 10 can rotate together or separately. In other embodiments the tray 6 has more cones 21, preferably the amount of cones 21 and tubes 9 are the same, allowing the carousel 10 and the tray 6 rotating together, and thus the selected amount of tubes 9 can be filled simultaneously. After filling, the device ejects the filled tubes 9 with the ready cigarettes inside through the door 7 of the carousel cover 8. If more than one tube 9 was filled, the device dispenses the tubes 9 one-by-one in sequence by rotating the carousel 10. Dispensing another filled tube 9 may also be initiated by pushing a button. The carousel 10 is driven by the carousel motor 23 or the motor 11, which are powered by the power supply 12. Optional steps, like measuring the weight of the herbs and/or tobacco and/or spices placed in the grinding chamber 2 and/or the weight of the mixture in the mixing chamber 5 and/or the weight of the mixture filled in the pre-rolled cigarette papers 17; or compressing the mixture in at least one pre-rolled cigarette paper 17 and/or vibrating at least one tube 9 with the vibrating element 18 is also possible. The method can be started over from grinding automatically. When the grinding chamber 5 becomes empty, the user may add any herbs and/or tobacco and/or spices, and then the process can start again from the beginning. The different steps of the process can be performed and started automatically or by user's interaction as well.

With reference to FIG. 12, alternative embodiments of the device for grinding and mixing of herbs and/or tobacco and/or spices are now described. It should be understood that the elements of these alternative embodiments that are in common with the embodiments discussed above are not described again for the sake of brevity. In an alternative embodiment of the device, a grinding chamber and a mixing chamber can be employed as a single, removable unit 1200. Here, the unit 1200 can replace elements 2 and 5 described above and interact with the remaining portions of the device of FIG. 1 as described in detail herein above. Here, the grinding chamber 1202 and the mixing chamber 1206 are coupled such that the grinding chamber 1202 and the mixing chamber 1206 are fully extractable from the main device as a single unit 1200. The extraction of the unit 1200 provides a convenient way to store any ground mixture remaining therein, as discussed in detail herein below with respect to FIGS. 16A-B. In addition, a user can have a plurality of such units 1200 to enable convenient grinding/mixing and storing of different materials by simply replacing a unit 1200 with another unit 1200 in the main device. The unit 1200 may slide into a housing of the device through a housing opening. The grinding chamber 1202 and mixing chamber 1206 of unit 1200 may be surrounded by the housing. A cap 1602, as shown in FIGS. 16A and 16B, may attach to a top end of the grinding chamber or the housing and enclose the unit 1200 inside of the housing of the device. The unit 1200 includes a sieve 1204 that is disposed between and separates the grinding chamber 1202 and the mixing chamber 1206, and permits for the ground material to exit the grinding chamber 1202 through holes 1205 of the sieve. The sieve 1204 is also extractable from the unit 1200 and can be replaced with other sieves that have different sized holes or apertures 1205. Thus, the sieve can be switched out of the unit 1200 to enable the transfer of the herbs and/or tobacco and/or spices from the grinding chamber 1202 to the mixing chamber 1206 at different granularity levels. The unit 1200 also includes a coupler 1208 that attaches or couples to the below drive shaft 15 of the motor 11, discussed above regarding FIG. 1, when the unit 1200 is inserted into the device. The coupler 1208 is connected to an internal axle/shaft 1300, discussed with respect to FIG. 13 below, disposed in the unit 1200 to drive both the grinder unit and the mixing unit of the griding chamber 1202 and the mixing chamber 1206, respectively. The coupler 1208 can include a tooth or a projection which connects with the drive shaft 15 of the motor 11 when the device for grinding and mixing herbs is assembled with unit 1200.

With reference now to FIG. 13, the mixing chamber 1206 can include the internal axle/shaft 1300 and a mixing rod 1302, coupled to the axle/shaft 1300. The axle/shaft 1300 is disposed on the central axis 16 and is connected to the main motor 11, which also drives the grinder unit, discussed above. The rod 1302 rotates in the mixing chamber 1206 to mix the ground material that has been deposited from the grinding chamber 1202 through the sieve 1204. The mixing rod 1302 also functions for filling a paper cone in the tube in the carousal 10, as it sweeps the mixture over the nozzle 20 above the tray 6 disposed below the mixing chamber 1206. Turning now to FIG. 15A, the nozzle 20 can be opened and closed using a servo engine on the main device. This ensures the material is stored in the mixing chamber 1206 and ready to be used to fill another paper cone when the user desires. In addition, the closing of the nozzle 20 can assist in storage of any herbs and/or tobacco and/or spices when the unit 1200 is removed from the main device. Turning now to FIG. 13, the mixing rod 1302 is connected to the axle/shaft 1300 via a clutch bearing 1306, which constricts the mixing rod to move in only one rotational direction. In particular, when the axel/shaft 1300 rotates in one direction, the mixing rod moves to mix the herbs and/or tobacco and/or spices; when the axle/shaft 1300 rotates in the opposite direction, the mixing rod 1302 does not move due to the structure of clutch bearing 1306. The axle/shaft 1300 is also coupled to the grind blades 1304, which are disposed in the grinding chamber 1202 and function as the grinder unit of the grinding chamber 1202 to grind the herbs and/or tobacco and/or spices. The grind blades 1304 are directly coupled to the axle/shaft 1300 so that the grind blades 1304 are capable of moving in both directions in which the axle/shaft 1300 rotates. With reference to FIGS. 1, 12, and 13, the axle/shaft 1300 is driven by the drive shaft 15 of the motor 11 via the coupler 1208. Thus, in accordance with an exemplary embodiment, the motor 11 is configured to operate in a forward direction and in a reverse direction. When the motor 11 operates in the forward direction, both the mixing unit, comprising the mixing rod 1302, and the grinder unit, comprising the grind blades 1304, are driven by the motor 11. When the motor 11 operates in the reverse direction, the mixing unit ceases mixing and the grinder unit is driven by the motor 11. This process can ensure that the ground material in the mixing chamber does not get affected when grinding is taking place and/or can reduce wear and tear of the mixing unit when there is an insufficient amount of material in the mixing chamber 1206 to be properly mixed.

It should be understood that although the grinder unit of the grinding chamber 1202 and the mixing unit of the mixing chamber 1206 of FIGS. 12-13 employ different grinding and mixing mechanisms than the grinder unit 3 and the mixing unit 4, respectively, of FIG. 1, the grinding and mixing mechanisms of the grinder unit 3 and the mixing unit 4 can be employed within the single unit 1200 as understood by those skilled in the art.

Referring to FIGS. 14A-D, an exemplary embodiment of a tube 1400 that can be used in the carousel 10, shown in FIGS. 1, 3, and 5, and can include a rolled paper cone to enable proper filling of the mixed herbs and/or tobacco and/or spices as discussed in detail above. Tubes 1400 can be used in place of tubes 9 in carousel 10, or one or more tubes 1400 can be loaded into the carousel 10 with one or more tubes 9 also loaded in the carousel. The tubes 1400 have a through hole/window/aperture 1402 that enables the device to detect, via a light sensor, when filling of the tube should be stopped. Here, the through hole/window/aperture can be closed, such tubes being made of one single part or multiple, which would allow the user also to fill a tube 1400 with the ground and mixed herbs and/or tobacco and/or spices, without a paper cone inside. For example, the tube 1400 may include a cap 1406 that functions to close the hole/window/aperture 1402 when placed on the tube body

1408 to permit the user to store the ground and mixed herbs and/or tobacco and/or spices with or without the paper cone 17. In accordance with an exemplary embodiment, the tubes 1400 may each have a ferromagnetic ring 1404, composed of an appropriate ferromagnetic metal or alloy, attached to the top opening 1405 of the tube 1400. Inside the device, when the carousel 10 turns, one of the tubes 1400 can be positioned below the nozzle 20. FIG. 15A illustrates an exploded view of a magnetic mechanism 1510 of the device, while FIG. 15B illustrates the magnetic mechanism 1510 constructed within the device. Here, the magnetic mechanism 1510 is configured to interact with the ring 1404 and seal the tube 1400 during delivery of the ground herbs and/or tobacco and/or spices from the mixing chamber 1206. The magnetic mechanism 1510 can include a magnet 1502 that is disposed near the nozzle 20 so that tube 1400 is pulled up and held in position while filling process takes place. The magnetic mechanism 1510 also effectively seals the tube 1400 and prevents the ground and mixed material from being expelled from the tube 1400 during filling. The magnet 1502 can be coupled to the vibrating engine 1504, which in turn is coupled to the inside surface of the carousel cover 8 and/or embedded in the tray 6 so that it is positioned near the nozzle 20. The vibrating engine 1504 can be employed to vibrate the tube 1400 to permit packing of the mixed herbs and/or tobacco and/or spices in the paper cone if present or in the tube 1400 itself. In addition, when the carousel 10 moves, the tube 1400 can be placed back into position in the carousel 10, guided by the tube holders 14. Alternatively, the user may simply pull the tube 1400 from the tube holder when removing the tube 1400 from the device. Therefore, the dispensing methodology can be used for loading the device with tubes, by applying the methodology in reverse order. In this embodiment, as indicated in FIGS. 14A-D, the pre-rolled cigarette paper cone 17 is completely submerged in the tube, and, for ease of extraction, the tubes 1400 are built of two parts, an upper part composed of the tube body 1408 and a bottom part composed of the base 1410. The tube body 1408 and the base 1410 are movable relative to each other through the use of an internal spring 1412. By pushing up on the tube base 1410 so that the tube base 1410 telescopically compresses inside of tube body 1408, the pre-rolled cigarette with a bottom end resting on the base 1410 bottom is pushed up so that a top end of the cigarette extends above the top opening of the tube 1400. By releasing the tube base 1410, tube base and tube body 1408 will telescopically extend under tension of the spring 1412.

With reference now to FIGS. 16A-16B, the modular functionality of the unit 1200 is illustratively depicted. Here, the unit 1200 can be stored, filled with ground and/or mixed herbs and/or tobacco and/or spices in a container 1600 which includes a dock 1632 that matches the coupler 1208. The container 1600 includes controller 1610 and a transceiver 1608. It should be noted that the controller 1610, the transceiver 1608 and the various other sensors and lighting devices described herein below are optional in that any one or more of these components can be removed to form an alternative embodiment within the scope of the present application. The controller 1610 includes a processor and a storage medium, such as, for example, a solid-state storage device, configured to run software to implement the various functionalities of the controller described herein. In addition, it should be understood that although the controller 1610 and the transceiver 1608, which is coupled to and in signal communication with the controller 1610, are depicted as being part of the container 1600, in alternative embodiments the controller 1610 and the transceiver 1608 can be incorporated within the mixer/grinder unit 1200. In addition, the controller 1610 and the transceiver 1608 can be incorporated into the controlling unit 24 discussed above. The transceiver can be configured to send and receive radio frequency (RF) signals in accordance with the Bluetooth Standard, WiFi specifications, or any other suitable RF technology.

In accordance with one exemplary aspect, the lid 1602 can include one or more magnets 1630 that can be employed with one or more magnetic sensors 1631 disposed in the grinding chamber 1202 near the top of the chamber 1202. It should be noted that the lid 1602 can be used with the container 1600 and/or with the main device in lieu of the top 1. The magnetic sensors 1631 sense movement corresponding to a motion created by the user, either by pressing the top button, or turning the lid 1602. The magnetic sensors 1631 can communicate the movement wirelessly to the controller 1610 via the transceiver 1608, and the controller 1610 can control the display 1626, which acts as a user interface, by, for example, presenting menu options on the display 1626 to a user and permitting the user to scroll through the options scrolling through the menu by turning the lid 1602 or pressing the lid 1602. The display contains one or more touch sensitive areas which, when touched by a user, generate a signal that is sent to the controller 1610. Alternatively, or additionally, the display 1626 can provide notifications, such as “low battery,” for example, to the user. Further, as opposed to employing the magnetic sensors 1631 and magnets 1630, the display 1626 can be a touch screen in wired or wireless signal communication with the controller 1610. The menu options can permit various levels of control, such as starting and stopping the grinding and/or mixing by the unit 1200, as well as adjusting the speed and/or duration of the grinding and/or mixing and/or the direction of rotation by the axle/shaft 1300. The control of these grinding and/or mixing functionalities can be implemented via the controller 1610, which can be communicatively coupled to and control the activation, deactivation, duration, direction and/or speed of a motor 1604 in the container 1600, through either wired or wireless communication through the transceiver 1608. The motor 1604 functions in the same way as the motor 11 described above in that the motor 1604 drives grinder and mixing units of the grinding chamber 1202 and mixing chamber 1206, respectively. In addition, the controller 1610 can control the motor 11 in the same manner when implemented in the controlling unit 24 of the main device or if implemented within the grinder/mixing unit 1200. Moreover, the menu options can additionally or alternatively be provided to an application on a user’s mobile device, such as a smart phone or a tablet computer, communicatively coupled to the controller 1610 via the transceiver 1608. By employing the application, the user can control the device in the same way as discussed above with respect to the display 1626.

In another exemplary aspect, the system can provide a humidor function. For example, the mixing chamber 1206 and/or the grinding chamber 1202 can include a humidity sensor 1620 that is in wired or wireless communication with the controller 1610 and provides humidity measurements. If the device is being used in a humid environment, the mixing chamber 1206 or the grinding chamber 1202 can further include a pouch 1621 configured to hold a dehumidifying pack 1621*a* which can contain, for example, silica gel. Alternatively, the mixing chamber 1206 or the grinding chamber 1202 can further include a humidification pack 1621*b* that releases or absorbs water vapor through a membrane. The controller 1610 can employ the humidity sensor

1620 to monitor the humidity within the grinder/mixing unit 1200 and, when the humidity rises above or below either a predetermined or user defined threshold, the controller 1610 can control the display 1626 to provide a notification to the user that the dehumidifying pack 1621*a* or humidification pack 1621*b* should be changed. A lower threshold can be 62% relative humidity and an upper threshold can be 72% relative humidity. A user can select different relative humidity thresholds based on the types of herbs being stored and user preference. The thresholds can be pre-set by or can be set by the user using the display 1626. The notification can additionally or alternatively be provided through an additional component 1634, such as a speaker. Additionally, or alternatively, the notification can be provided to the application on the user's mobile device described above. The mixing chamber 1206 and/or the grinding chamber 1202 can also be fitted with a lighting unit 1624 configured to output light having wavelengths that prevent and/or identify mold formation. For example, the lighting unit 1624 can be configured to output green light to protect against mold formation, and/or the lighting unit 1624 can be configured to output black light to aid the user in identifying mold formation.

It should also be noted that in accordance with other exemplary aspects, the controller 1610 can employ a light sensor 1512 and a lighting unit 1514, illustrated in FIGS. 15A-15B. The light sensor 1512 and the lighting unit 1514 can be attached to a coupler 1516 on which the vibrating engine 1504 is mounted. As indicated above, the coupler 1516 can be attached to the inside surface of the carousel cover 8 and/or to the tray 6. Here, the lighting unit 1514 can output light at a given intensity through the aperture 1402 of the tube 1400. The light is in turn is received by the light sensor 1512, which measures the intensity and transmits a signal indicating the intensity to the controller 1610, when implemented in the controlling unit 24 of the main device or if implemented within the grinder/mixing unit 1200. The signal can be transmitted wirelessly or through a wired electronic coupling between controller 1610 and the light sensor 1512. The light can be received through any rolling paper 17 disposed in the tube 1400, or can be received directly through the tube aperture 1402 without any paper. In accordance with one exemplary aspect, the controller 1610 can determine that the tube holder 14 contains a tube 1400 and/or contains a paper cone 17, and/or whether it is filled with the ground herbs and/or tobacco and/or spices when the light intensity falls below a light intensity threshold, and the controller 1610 can close the nozzle 20 by controlling a servo engine coupled to the nozzle 20. In addition, a sensor can be placed on the carousel 10, which detects when the user has removed the filled tube 9 or filled paper cone 17 from the device, as to automatically close the door 7. Moreover, the coupler 1516 may include a twister module for closing a filled paper cone 17 by twisting or folding the remaining unfilled paper of the cone after the controller 1610 determines that the tube 1400 is filled.

In addition, the controller 1610 can employ the transceiver 1608 to connect wirelessly to a communication network external to the device and the container. For example, the transceiver 1608 could connect the controller 1610 to a WiFi network, or other suitable RF network, for communication with the user's mobile device and/or with servers on the internet. Further, the grinding chamber 1202 can include a tag reader 1622, which can be implemented as a camera, a radio frequency identification (RFID) reader and writer, a near field communication (NFC) reader, or other suitable digital reader. Here, the tag reader 1622 can be configured to read a tag, such as a quick response (QR) code, a bar code, an RFID tag, or NFC chip and transmit the data read from the tag to the controller 1610 via the transceiver 1608 and/or through a wired connection in the system. For example, the tag can be read from a package from which the herbs and/or tobacco and/or spices to be ground an mixed were obtained, and the controller 1610 can access its internal storage device and/or a server on the internet to obtain identification of and/or information about the herbs and/or tobacco and/or spices for display to the user via the display 1626 or via the application on the user's mobile device. Alternatively, or additionally, the information can indicate the speed and/or duration of grinding and/or mixing of the herbs and/or tobacco and/or spices, and the controller 1610 can control the motor 11/1604 base on or in accordance with the indicated speed and/or duration. Further, the information can indicate the appropriate sieve that a user should install into the mixer/grinder unit 1200, and the controller 1610 can notify the user of the correct sieve by identifying the sieve on the display 1626 or on the display on a user's mobile device via the application on the mobile device.

It should also be noted that the container 1600 and/or the bottom cover 13 discussed above can include additional components 1634. For example, the components 1634 can include a speaker for sounds, such as, for example, music and notifications. The components 1634 can further include a microphone for voice commands, where the microphone is in signal communication with the controller 1610 to implement a user's voice commands. Further, the components 1634 can include an electric lighter for lighting the filled paper cone in case the device is used for smoking purposes. Moreover, the components 1634 can include a kill switch. For example, the switch can be configured to disable the motor 1604/11 when the lid 1602 is removed, thereby preventing the grinder unit from operating while the lid 1602 is off.

The container 1600 and/or the bottom portion 13 of the main device can further include rechargeable batteries 1605, a scale 1606, which can have an accuracy of, for example, +/−0.1 gram, and a wake up/standby/child lock touch button. The batteries 1605 can power each of the components of the main device, the grinder/mixing unit 1200 and/or the container 1600. Further, the scale 1606 can be in signal communication with the controller 1610, which can in turn indicate to a user the weight of the herbs and/or tobacco and/or spices in the main device and/or the grinder/mixing unit 1200 in the container 1600. The indication can be displayed on the display 1626 or on the display on a user's mobile device via the application on the mobile device. Further, the main device can include light emitting diodes (LEDs) indicating the number of tubes containing paper cones to inform the user how many paper cones are left in the device.

The design of the grinder/mixing unit 1200 and the container 1600 enables a user to have multiple separate grinder/mixing units in order to store various ground materials. The grinder/mixing units 1200 can be put into a separate container 1600 which can act as a dispenser. For example, as illustrated in FIGS. 16A-16B a user can remove the compartment 1636, which receives the dispensed ground mixture, of the container 1600 to permit the tube 1400 to be filled with the ground/mixed material from the mixing chamber 1206. The container can be powered (e.g., through a rechargeable battery), have wireless capabilities, have scale capabilities and many other functionalities, including the display of information about the ground/mixed materials in the container 1600.

In accordance with an exemplary aspect, the modular design can be employed in a method in which herbs and/or tobacco and/or spices are added to the grinding chamber 1202. The herbs and/or tobacco and/or spices are ground with the grind blades 1304 of the grinder unit of the grinding chamber 1202. The ground herbs and/or tobacco and/or spices are forwarded to the mixing chamber 1206, which in turn mixes the ground herbs and/or tobacco and/or spices with the mixing rod 1302 of the mixing unit of the mixing chamber 1206 thus creating a mixture. The single unit composed of the grinding chamber 1202 and the mixing chamber 1206 from is extracted from the device. The single unit includes a coupler 1208 that is configured to removably attach to and engage with the drive shaft 15 of the device when coupled to the device. The coupler 1208 of the single unit is coupled to a container 1600 for storage, where the container or the single unit comprises a controller configured to receive and/or transmit data on a communication network external from the device.

The invention is not restricted to the above-described embodiments. In addition to the above examples, the invention may be implemented within the scope of protection in other forms.

What is claimed is:

1. A device for grinding and mixing of herbs and/or tobacco and/or spices, preparing and dispensing of cigarettes, the device comprising:

a grinding chamber for holding and grinding the herbs and/or tobacco and/or spices, wherein the grinding chamber has a top, the grinding chamber is equipped with a grinder unit, the grinder unit is connected to a motor, the motor being configured to drive the grinder unit;

a mixing chamber, on which said grinding chamber is mounted, for mixing the herbs and/or tobacco and/or spices, which is located below the grinding chamber, the mixing chamber including:

a mixing unit located in the mixing chamber and connected to the motor via a drive shaft;

a tray, located below the mixing chamber, configured to deliver the ground herbs and/or tobacco and/or spices into at least one tube of a plurality of tubes for holding the pre-rolled cigarette papers and receiving ground herbs and/or tobacco and/or spices;

a carousel, which is located below the tray, is rotatable around a central axis and is located within a carousel cover, said carousel including a plurality of tube holders configured for holding the plurality of tubes, and said mixing chamber being mounted on the carousel cover, wherein at least one door is on the carousel cover for dispensing the at least one tube with the filled pre-rolled cigarette paper; and a power supply connected to the motor, wherein said power supply is located in a bottom cover on which said carousel cover is mounted, wherein the grinding chamber and the mixing chamber are coupled such that the grinding chamber and the mixing chamber are extractable from the device as a single unit.

2. The device of claim 1, wherein the motor is configured to operate in a forward direction and in a reverse direction, and wherein:

a) when the motor operates in the forward direction, both the mixing unit and the grinder unit are driven by the motor; and b) when the motor operates in the reverse direction, the mixing unit ceases mixing and the grinder unit is driven by the motor.

3. The device of claim 1, wherein the single unit comprises a coupler that is configured to attach to said drive shaft when coupled to the device and, when extracted from the device, to attach to an additional motor that is configured to dispense the ground herbs and/or tobacco and/or spices.

4. The device of claim 1, further comprising:

a removable sieve disposed between the grinding chamber and the mixing chamber, wherein the sieve is configured to be switched out of the device to enable the transfer of the herbs and/or tobacco and/or spices from the grinding chamber to the mixing chamber at different granularity levels.

5. The device of claim 1, wherein the at least one tube comprises a ferromagnetic ring disposed on a top of the at least one tube and wherein the carousel cover and/or the tray comprises a magnetic mechanism configured to interact with the ring and seal the at least one tube during said delivering of the ground herbs and/or tobacco and/or spices.

6. The device of claim 5, wherein the at least one tube is configured such that a pre-rolled cigarette paper is disposable within the at least one tube such that the paper is completely submerged in the at least one tube, and wherein the at least one tube is composed of movable parts and comprises an internal spring.

7. The device of claim 1, further comprising:

a controller configured to control at least one operation of the device; and a user interface.

8. The device of claim 7, further comprising:

a light sensor, wherein the at least one tube comprises an aperture enabling the light sensor to detect when the at least one tube is filled with the ground herbs and/or tobacco and/or spices, wherein the controller is configured to receive a signal from the light sensor indicating that the at least one tube is filled with the ground herbs and/or tobacco and/or spices, and wherein the controller is configured to close a nozzle in said mixing chamber in response to receipt of said signal.

9. The device of claim 7, further comprising:

a dehumidifying pack or a humidification pack; and a humidity sensor configured to measure humidity within the device and to indicate to the controller that the humidity has passed or has fallen below a threshold, wherein the controller is configured to indicate to a user through the user interface that the dehumidifying pack or the humidification pack should be changed.

10. The device of claim 7, wherein the controller is configured to receive and/or transmit data on a communication network external from said device.

11. The device of claim 10, further comprising:

a tag reader configured to read a tag from a package of the herbs and/or tobacco and/or spices and transmit read data to the controller, wherein the controller is configured to receive information about the herbs and/or tobacco and/or spices through the network.

12. The device of claim 11, wherein the controller is configured to control the at least one operation based on the information.

13. The device of claim 12, wherein the at least one operation comprises managing a speed and/or duration of the grinding and/or the mixing.

14. The device of claim 1, further comprising a lighting unit configured to output light having wavelengths that prevent and/or identify mold formation.

15. A system for grinding and mixing of herbs and/or tobacco and/or spices, preparing and dispensing of cigarettes, the system comprising the device of claim 1 and a container configured to be coupled to the single unit when extracted, wherein the container or the single unit comprises a controller configured to receive and/or transmit data on a communication network external from said device.

16. A method for utilizing the device of claim 1, comprising:

adding herbs and/or tobacco and/or spices to the grinding chamber;

grinding said herbs and/or tobacco and/or spices with the grinder unit;

forwarding the ground herbs and/or tobacco and/or spices to the mixing chamber, and mixing the ground herbs and/or tobacco and/or spices with the mixing unit in the mixing chamber thus creating a mixture;

extracting the single unit from the device, wherein the single unit comprises a coupler that is configured to removably attach to said drive shaft when coupled to the device;

coupling the coupler of the single unit to a container for storage, wherein the container or the single unit comprises a controller configured to receive and/or transmit data on a communication network external from said device.

* * * * *